3,273,147
PULSE RADAR SYSTEM
Stélian Herscovici, Paris, France, assignor to CSF—
 Compagnie Generale de Telegraphie Sans Fil, a
 corporation of France
Filed Nov. 5, 1964, Ser. No. 409,175
Claims priority, application France, Nov. 8, 1963,
953,090
9 Claims. (Cl. 343—7.7)

The present invention relates to the suppression of fixed echoes in pulsed radar receivers or Moving Target Indicators (MTI).

Methods for eliminating fixed echoes which appear on radar indicators are subject to well known limitations due to blind speeds at which the target echoes are also suppressed. Blind speeds $V_r$ are determined by the relation $$V_r = K \frac{\lambda}{2T}$$

where K is an integer, $\lambda$ is the wavelength of the carrier wave, and T is the repetition period of the transmitted pulses.

In order to reject blind speeds beyond the maximum speed of the targets to be detected, it would often be necessary to increase $\lambda$ or reduce T, which is generally not possible. Instead of so doing, the repetition frequency is wobbulated about a mean value, so that the periodic attenuations of the echoes from moving targets is partly suppressed; however at low speeds the speed range for which this attenuation is avoided is too small, in particular if the antenna is rotated at a high speed or when echoes from slow moving obstacles, such as clouds or chaffs are to be eliminated.

It is also known to transmit successive pulses alternately spaced by intervals $T_1$ and $T_2$, which are different and of the same order of magnitude. This method commonly known as "alternate bi-recurrent," is, in a way, a particular case of the abovementioned method. It is generally used in the same way and has the same drawbacks.

It is an object of the invention to improve the alternate bicurrent method. This is achieved by a particular treatment of the received echoes, whereby the above drawbacks are removed.

It is a further object of the invention to provide a radar system operating according to the above improved method.

According to the invention a comparison is made of the coherent phases of the echoes from a given target in response to the three successive transmissions.

By "coherent phase" is meant the phase of the echo carrier wave with respect to an oscillation coherent with the carrier of the transmitted pulse.

By this process the minimum blind speed is easily rejected beyond the maximum speed of the useful targets.

For, $T_1 = T + \theta$ and $T_2 = T - \theta$ being the two recurrence periods used, these periods differing by $2\theta$, and this difference being small with respect to the mean period T, the expression obtained is $\Delta = (\varphi_1 - \varphi_2) - (\varphi_2 - \varphi_3)$, or its sine. For the echoes from fixed targets, $\Delta = \sin \Delta = 0$; since it may be shown that $$\Delta = \frac{4\pi}{\lambda} V_r \theta$$

this defines the first blind speed $$V_r = \frac{\lambda}{2 \cdot 2\theta}$$

According to a first method of putting the invention into practice successive echoes are caused to beat in pairs, after they have been subjected to appropriate frequency changes, and after the "sum" frequencies have been eliminated, the difference of the beats is taken; the envelope of this difference is then detected, the signal obtained being of the form $$|\sin \Delta| = \left| \sin \frac{4\pi V_r \theta}{\lambda} \right|$$

According to another method of putting the invention into practice the coherent phases $\varphi_1$, $\varphi_2$, $\varphi_3$, corresponding to the three echoes, are stored digitally or analogically and the algebraic sum $\varphi_1 + \varphi_3 - 2\varphi_2$ is formed.

The invention will be better understood and other characteristics thereof will become apparent from the following description with reference to the accompanying drawing wherein:

FIG. 5 shows a modification of the circuits of FIGS. 3 and 4.

Figure 1:
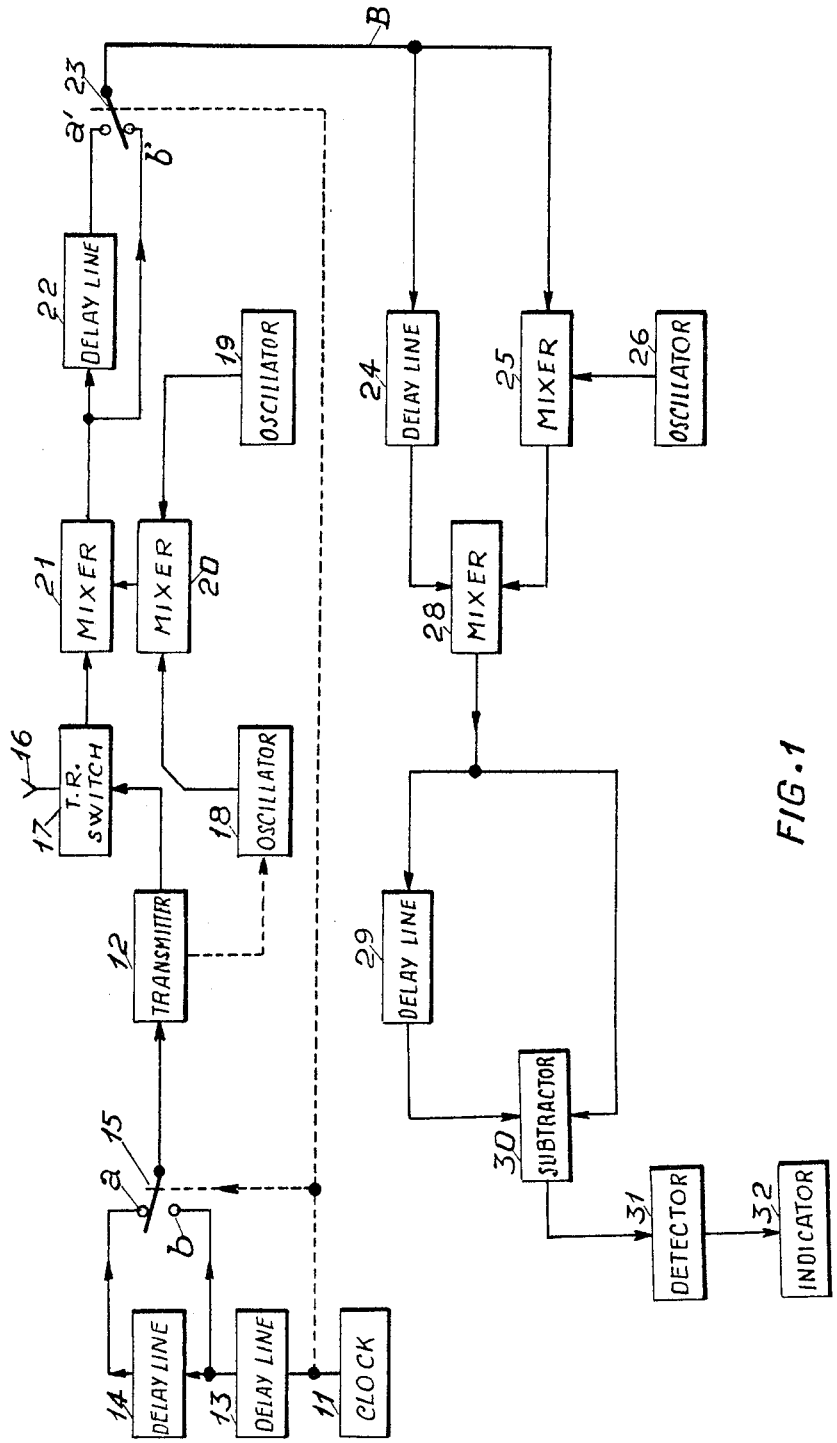
FIG. 1 is one example of an arrangement in accordance with a first mode of putting the invention into practice.

The circuit of FIG. 1 comprises a clock 11 which supplies synchronizing signals of a period T, a first output of clock 11 controls a transmitter 12 through a first delay line 13 with a delay $\epsilon$, a second line 14 with delay $\theta$, and a switch 15 with two operating positions $a$ and $b$. In position $b$, line 14 is switched out. Switch 15 swings at frequency T, between its two operative positions, i.e. it stands in position $a$ for a time T, then in position $b$ for a time T, and so on. It may be actuated, for example, by a bistable multivibrator (not shown) actuated by the signals from clock 11, as shown diagrammatically by a broken line. Delay $\epsilon$ is aimed at ensuring that switch 15 is already in position $b$ on the arrival of the pulse synchronizing transmitter 12, which feeds antenna 16 through a T–R switch 17. Delay $\epsilon$ will thus have to be very short as compared to T (of the order of a few percent). This latter point will be considered in more detail further on.

A coherent oscillator 18, controlled by transmitter 12 and of the same frequency $f_0$, and an auxiliary oscillator 19 whose frequency will be equal to the receiver intermediate frequency $f_i$ (e.g., of the order of 30 mc./s.) feed a subtractive mixer 20 whose output signal, of a frequency $f_0 - f_i$, is mixed in a subtractive mixer 21 with the echoes picked up by antenna 16 and collected at the "reception" output of T–R switch 17, which is operated in a conventional manner by means of the synchronizing pulses from clock 11. The output of mixer 21 is coupled to a delay line 22 with a delay strictly equal to $\theta$. A switch 23 with two terminals $a'$ and $b'$ respectively coupled to the output of line 22 and to the output of mixer 21, is actuated in synchronism with switch 15 but in the reverse direction, i.e., in such a manner that when switch 15 is in position $a$, switch 23 is in position $b'$, and conversely. Switch 23 feeds in parallel a delay line 24 with a delay T and a circuit including a subtractive mixer 25 fed by an auxiliary oscillator 26 of frequency $F_i$ (e.g., of the order of 10 mc./s.).

The output of mixer 25, which is followed by a low-pass filter (not shown), and the output of line 24 feed a substractive mixer 28 whose output feeds, on the one hand directly and, on the other hand, through a delay line 29 of a delay T, a subtractor 30. The output signal from the latter constitutes, after detection in a detector 31, the useful signal which is fed to indicator 32.

Frequency $f_0$ being the carrier frequency of the pulses transmitted by transmitter 12, these pulses are transmitted at instants $\epsilon$, $\epsilon + T + \theta$, $\epsilon + 2T$, $\epsilon + 2T + \theta$ etc., that is to say at alternate time intervals $T + \theta$ and $T - \theta$.

At the receiver, echoes $E_k$ from a given target in response to successive transmission pulses $I_k(k=1, 2$ etc.) are received by antenna 16 at corresponding alternate time intervals, assuming, as is generally the case, that the ratio $V_r/c$ of the radial velocity of the target to the velocity of propagation of electromagnetic waves is negligible. At the output of mixer 21 these echoes are brought back to the angular frequency $\omega_i=2\pi f_i$ to within the Doppler frequency $$\left(\frac{2\omega_o V_r}{c}\right)$$

where $\omega_o=2\pi f_o$, which is the same for all the echoes, if $V_r$ is constant, as here assumed, and has a phase $\varphi_k+\Phi_1$, where $\varphi_k$ is the coherent phase of the echo and $\Phi_1$ is the initial, and arbitrary, phase of oscillator 19, which has to be perfectly stable in frequency and phase.

The instantaneous phase $\omega_i t$ of the auxiliary oscillator has been disregarded: in fact, it has been compensated either by means of a phase shifter in series in one of the input branches of switch 23, or by choosing the auxiliary frequency $\omega_i$ such that $\omega_i\theta=2k\pi$ ($k$ being a whole number).

At time $t_1$ after their respective moments of transmission, i.e., at respective times $\epsilon+t_1$, $\epsilon+T+\theta+t_1$, $\epsilon+2T+t_1$, signals $E_1$, $E_2$, $E_3$ are successively obtained at the output of mixer 21, it being assumed that $V_r$ is positive when the target is moving towards the transmitter.

$$E_1=\sin\left[\left(\omega_i+\frac{2\omega_o V_r}{c}\right)t_1-\frac{2\omega_0 x_o}{d}+\Phi_1\right]$$

$$E_2=\sin\left[\left(\omega_i+\frac{2\omega_o V_r}{c}\right)t_1-\frac{2\omega_o}{c}[x_o-V_r(T-\theta)]+\Phi_1\right]$$

$$E_3=\sin\left[\left(\omega_i+\frac{2\omega_o V_r}{c}\right)t_1-\frac{2\omega_o}{c}[x_o-2TV_r]+\Phi_1\right]$$

where $x_o$ is the distance between the target and the transmatter at the instant pulse $I_1$ reaches the target. These signals arrive at the output of switch 23 with a fixed repetition frequency T (still assuming that $V_r/c$ is negligible, an assumption which is made once for all and will not be repeated further).

These signals are then made to beat in pairs in mixer 28, the first signal of each pair having been delayed by T in line 24, and the second having undergone the angular frequency change $\Omega_i=2\pi F_i$ in the mixer 25. Similarly it is here assumed that $\Omega_i$ is a multiple of $2\pi/T$ or that the phase $\Omega_i T$ is compensated by a phase shifter inserted in one of the arms of the next circuit. By filtering out the upper beat, waves A' and B' are successively obtained at the output of mixer 28:

$$A'=\tfrac{1}{2}\cos\left[\Omega_i t_1+\frac{2\omega_o V_r}{c}(T+\theta)+\Phi\right]$$

$$B'=\tfrac{1}{2}\cos\left[\Omega_i t_1+\frac{2\omega_o V_r}{c}(T-\theta)+\Phi\right]$$

where $\Phi$ represents the sum of the initial phases of oscillators 19 and 26.

The output of mixer 28 is connected to the two inputs of a subtractor 30, respectively by a direct channel and by one including a delay line 29 providing a delay equal to T. Under such conditions subtractor 30 produces alternately the differences $B'-A'$ and $A'-B'$, where signal B' is the output of the direct channel and signal A' is the output of the delayed channel. The envelope of the difference is detected in detector 31.

The output signal from detector 31 will be used in a conventional manner, as in known arrangements, for eliminating fixed echo, e.g., as a signal for controlling the control electrode of a cathode-ray tube.

This signal is none other than $$\sin\frac{2\omega_o V_r}{c}\theta=\sin\frac{4\pi V_r}{\lambda}\theta$$

and is zero for $$\frac{4\pi V_r \theta}{\lambda}=k\pi$$

$\lambda$ being the wavelength of the carrier wave at angular frequency $\omega_o$.

That is to say that blind speeds are now defined by the relation $$V_r=k\frac{\lambda}{2.2\theta}$$

Thus all that is required is to make $2\theta$ less than $\lambda/2V_M$, where $V_M$ is the maximum speed of targets to be detected.

Thus, while a transmission with a constant repetition period $T=10^3$ μs on a wavelength of $\lambda=10$ cm. would correspond to a first blind speed of 50 metres per second, the same transmission with alternate recurrence $T+\theta$ will correspond to the first blind speed up to 500 metres per second, provided $2\theta$ is no greater than 10 percent of T.

Figure 2:
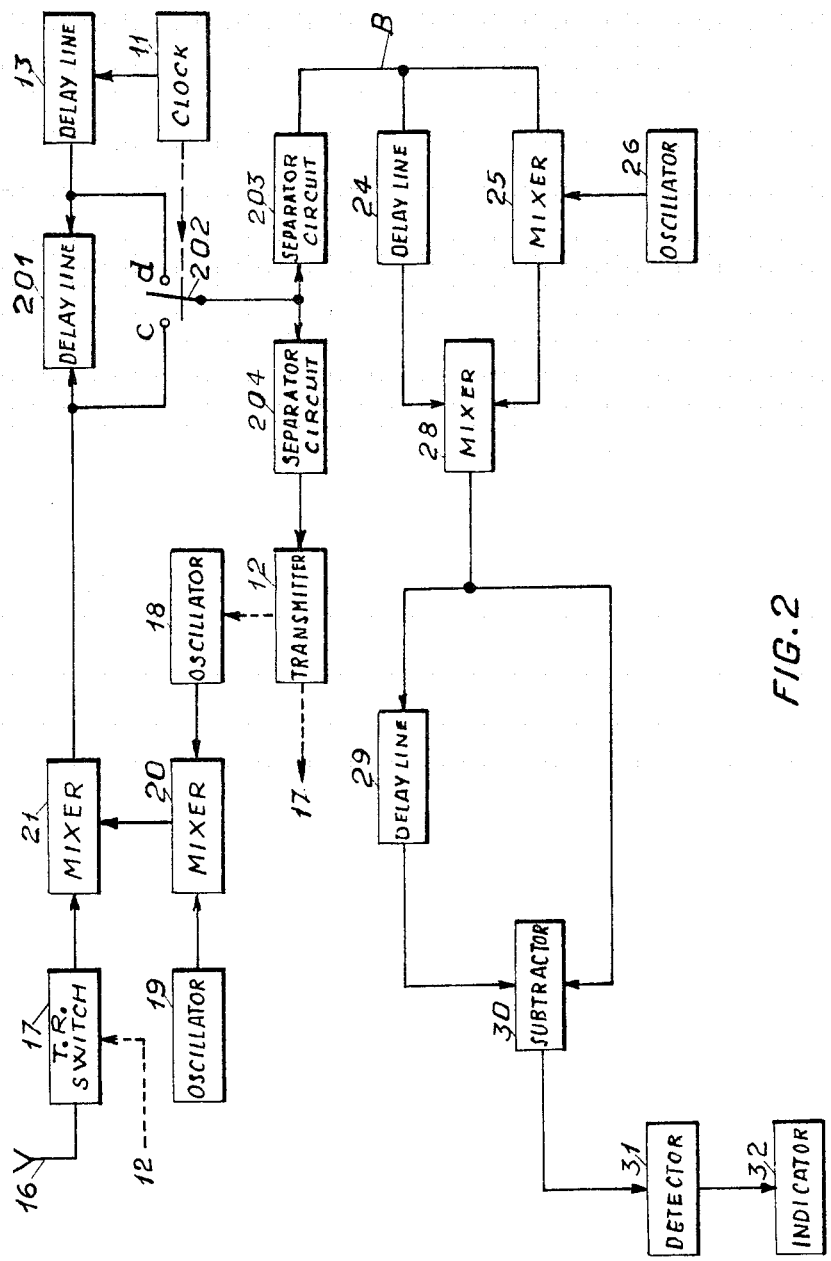
FIG. 2 is a diagram showing a modification of the circuit of FIG. 1.

The circuit of FIG. 2 differs from the former only in the transmitter synchronizing circuits and in those for transforming the rate of repetition of the received echoes.

In FIGS. 1 and 2 the same reference numbers designate the same components. In the circuit shown in FIG. 2, the output of delay line 13 and the output of mixer 21 are respectively connected to the two ends of the same delay line 201, of characteristic $\theta$. A switch 202 of period T operated by clock 11, in the same way as switches 15 and 23 of the circuit of FIG. 1, has two input positions $c$ and $d$ corresponding to the two ends of line 201. The output of switch 202 feeds in parallel two buffer components or separator circuits 203 and 204, whose outputs respectively feed point B, common to line 24 and to mixer 25, and the synchronization input of transmitter 12.

Thus for position $d$ of switch 202, the synchronizing signal will be delayed by $\theta$, while echoes received after this will not be so delayed, and conversely for position $c$; line 201 and switch 202, thus perform together the functions of the two parts of the circuit of FIG. 1, line 14, switch 15 and line 22, switch 23.

The purpose of components 203 and 204 is to separate the synchronizing signals from the received echoes; this separation may be based on the difference of level (amplitude filter) or of kind (frequency filter). Arrangements of this kind are well known in radar or television techniques and will not be described further.

The circuits of FIGS. 1 and 2 below point B are absolutely identical.

The circuit of FIG. 2 has over that of FIG. 1 the advantage of requiring only one delay line with a delay $\theta$; it thus removes the need to provide two strictly identical delay lines.

The phases of successive echoes can also be compared by means of a digital phase coder, as described in the copending U.S. application No. 406,782, filed by Carre et al., Oct. 27, 1964, for Digital Phase Coder, and assigned to the same assignees. It is then possible to store directly the phases of echoes received with respect to the corresponding coherent oscillations and to carry out in a digital computer the difference $$(\varphi_3-\varphi_2)-(\varphi_2-\varphi_1)=\varphi_1+\varphi_3-2\varphi_2$$

of the phases of three successive echoes from a given target, from which it would then be possible to derive the speed of the target.

This method may be particularly valuable when a digital computer, whose stores can be used as described, is already available.

Figure 3:
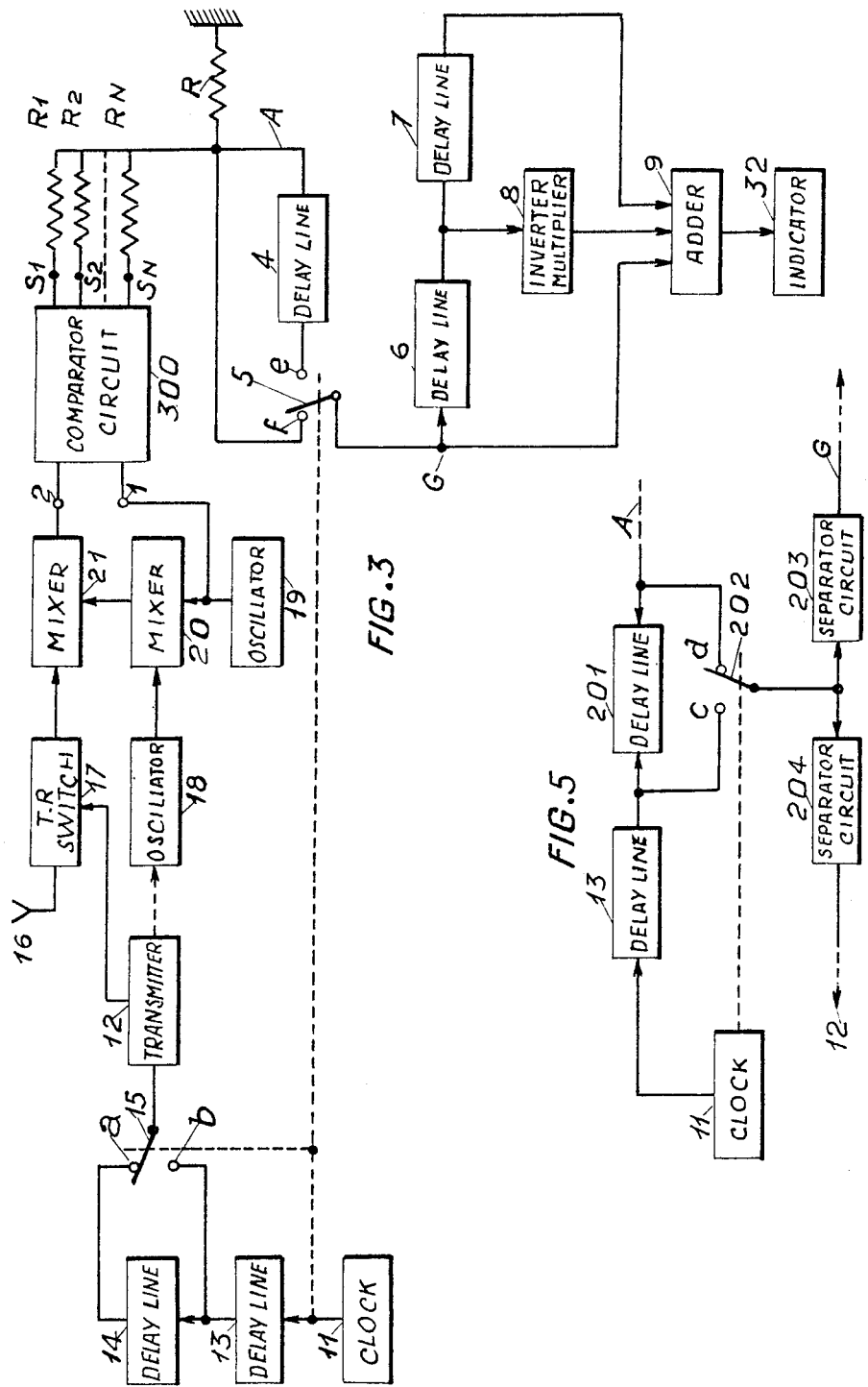
FIG. 3 is one example of an arrangement in accordance with a second mode of putting the invention into practice.
Figure 4:
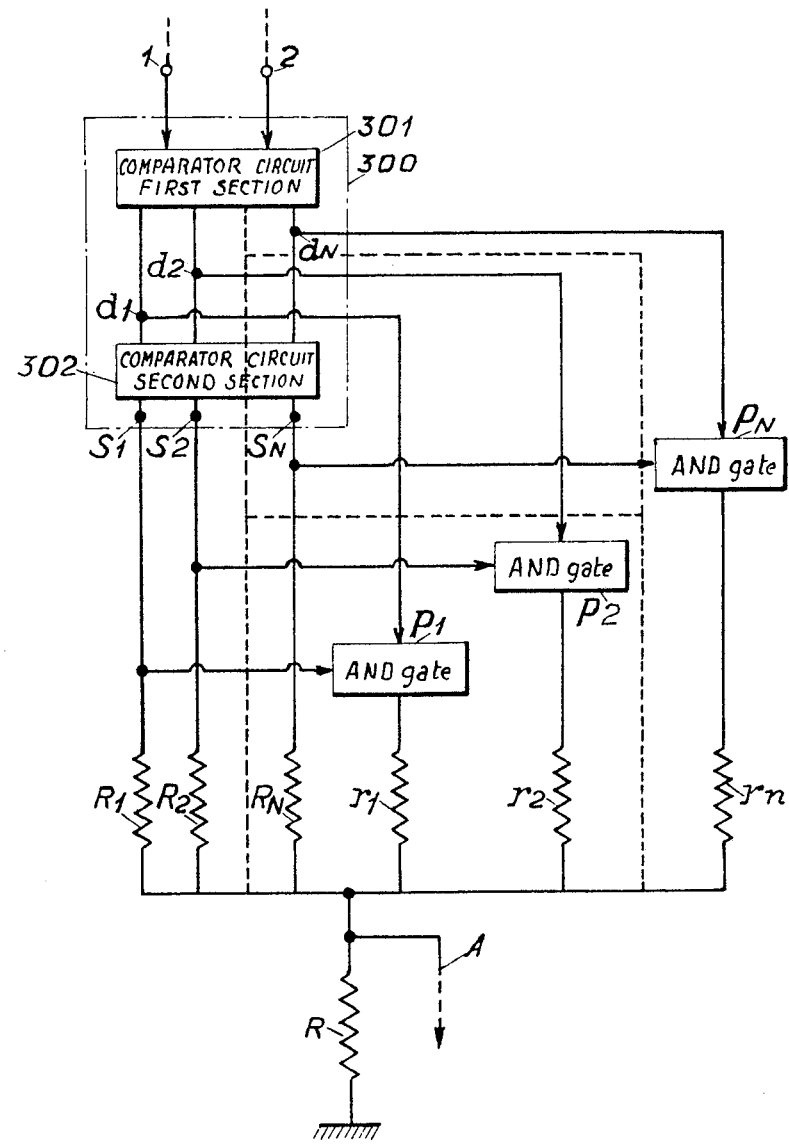
FIG. 4 is a diagram showing an improvement to the circuit of FIG. 3.

In other cases it may be preferable to use an analogue output signal of the measured phases, which is for example applied to resistors, for a temporary store, such devices being of a small bulk. FIGS. 3, 4 and 5 show some embodiments which use only the comparator circuit in the device described in the above copending patent application.

In these figures the same references designate the same components as in FIGS. 1 and 2.

In the circuit of FIG. 3 the outputs of mixer 21 and of auxiliary oscillator 19 are respectively connected to the two inputs 1 and 2 of the digital coder mentioned above. They feed the comparator circuit 300 of this coder which includes N outputs, as described in the above mentioned copending application, here designated by $S_1, S_2 \ldots S_N$; the respective suffixes 1 to N corresponding to those used in that application.

It is to be noted that comparator circuit 300 supplies a constant level pulse at one of its N outputs, the rank of that output being indicative of the value of the phase shift between the input signals.

N resistances, $R_1, R_2 \ldots R_N$, are connected, on the one hand, respectively to outputs $S_1$ to $S_N$, and, on the other hand, in parallel at point A at the input of a delay line 4 with a delay $\theta$. A resistance R of low value compared to $R_1$ to $R_N$ is inserted between point A and ground.

A switch 5 with two input terminals $\theta$ and $f$, respectively connected to the output of delay line 4 and point A, has its output connected to the input of a delay line 6 with delay T and to the first input of a linear adder 9.

The output of delay line 6 is connected on the one hand to an inverter multiplier of coefficient 2, and on the other hand to a delay line 7 with a delay T. The outputs of delay line 7 and of inverter multiplier 8 are respectively connected to the third and second inputs of adder 9, whose output supplies the useful signal which, as before, feeds indicator 32.

Resistances $R_1$ to $R_N$ are for all practical purposes (since R is small) inversely proportional to the weight of outputs $S_1$ to $S_N$ to which they are respectively connected, i.e. the signal which appears at an output $S_i$ ($i=1, 2 \ldots N$) showing a phase difference between the input signals equal to $i2\pi/N$, the resistance $R_i$ is inversely proportional to $i$.

The output voltage from device 9 is proportional to the sum $\varphi_1 + \varphi_3 - 2\varphi_2$, i.e. to $$\frac{4\omega_o V_r \theta}{c} = \frac{8\pi V_r \theta}{\lambda}$$

which is zero for $$V_r = \frac{\lambda}{2.2\theta}$$

In FIG. 3, the transmitter control circuits are strictly the same as in FIG. 1.

It can be seen that inputs 1 and 2 receive two signals with a frequency difference of $2\omega_o V_r/c$, which represents the Doppler frequency. This has no effect on the action of the arrangement since, this frequency being practically negligible against $\omega_1$, it results in a difference in the measured phase less than the precision of the comparator circuit, which is about $2\pi/N$.

The circuit shown in FIG. 4 permits working with enhanced precision while using the same phase comparator 300 by using the indications supplied by the phase detectors used in the comparator 300.

FIG. 4 shows circuit 300 divided into two parts, part 301 including the components of circuit 300 preceding the phase detector outputs, $d_1$ to $d_N$, and part 302 including the components below these outputs, i.e.: the N flip-flops and the N AND circuits whose outputs form the outputs $S_1$ to $S_N$ previously defined, and are connected, as in the circuit of FIG. 3, to resistances $R_1$ to $R_N$.

N AND gates, $P_1$ to $P_N$ have their signal inputs respectively connected to outputs $d_1$ to $d_N$ and their control inputs respectively connected to outputs $S_1$ to $S_N$. These gates feed respectively N resistances $r_1$ to $r_N$ also connected to point A defined above. Below point A the circuit is identical to that of FIG. 3.

Resistances $r_i$ ($i=1, 2 \ldots N$) are equal so long as the detectors are balanced.

If U is the maximum output voltage of a detector, and if this voltage is equal to the output voltage of the AND-circuits at $S_1$ to $S_N$, $r_1$ to $r_N = R_1$.

It is to be understood that the circuits of FIGS. 3 and 4 may be modified in accordance with that of FIG. 2, as regards transmitter and receiver synchronization. FIG. 5 shows the obvious modifications to be made to FIG. 3 for this purpose. In this figure the reference numbers are those already used in the description of FIGS. 2 and 3.

It would also be theoretically possible to suppress the auxiliary oscillator 19 by adapting the input circuit of device 300 which, as described in the above mentioned copending said patent application, includes a frequency changer, but in practice it will be preferable to make a frequency change before inputs 1 and 2.

Of course, the invention is not restricted to the embodiments described and shown.

In particular, depending on the operating conditions, on available components or on the kind of treatment to be effected later on the output signal, the arrangements described may be combined, or the signals may be stored without the use of delay lines.

What is claimed is:

1. In a pulse radar system in which pulses of radiant energy, transmitted by said system with a birecurrent repetition period of mean value T and reflected from targets, are beat with a reference "coherent" signal, synchronized with the transmitted pulse to provide a "coherent" echo signal, means for providing an improved control signal for a moving target indicator, said means comprising:

means for causing to beat each of said coherent echo signals with the said coherent signal originating from the preceding echo from the same target, said beating means including means for frequency translating one of the beating coherent signals and means for eliminating the "sum" frequency signals of said beat, said beating means having an output;

means, having an input coupled to said output, for providing the difference of two successive signals supplied to said input;

and detecting means, coupled to said last mentioned output and having an output supplying said improved control signal.

2. In a pulse radar system in which pulses of radiant energy, transmitted by said system with a birecurrent repetition period of mean value T and reflected from targets, are beat with a reference "coherent" signal, synchronized with the transmitted pulse to provide a "coherent" echo signal, means for providing an improved control signal for a moving target indicator, said means comprising:

first means for alternately delaying alternate coherent echo signals to provide signals with a constant repetition period T, said first means having an output;

a beating circuit comprising a first delaying channel of characteristic T and a frequency translating channel coupled in parallel to said output, and having an output;

a subtracting circuit comprising a second delaying channel of characteristic T and a direct channel coupled in parallel to said output of said beating circuit, and having an output; and a detector coupled to said output of said subtracting circuit.

3. In a pulse radar system comprising means for transmitting pulses of high frequency radiant energy at a birecurrent repetition rate of mean value $1/T$, means for receiving echo pulses reflected from targets, a coherent oscillator operating at said high frequency and synchronized with said transmitted pulses, a phase and frequency stabilized intermediate frequency oscillator, and means for deriving from said echoes and said high frequency and intermediate frequency oscillators intermediate frequency coherent echo pulses, means for providing an improved control signal for a moving target indicator, said means comprising:

a phase comparator circuit having two inputs respectively coupled to said means for derving said coherent echo pulses and to said intermediate frequency oscillator, and an output supplying a signal which is proportional to the phase difference $\varphi_i$ of the signals applied to the inputs of said comparator circuit where $i=1, 2, 3$ respectively for three successively received echoes from the same target;

and summing means, coupled to said output of said comparator circuit and supplying the algebraic sum $(\varphi_1-\varphi_2)-(\varphi_2-\varphi_3)$.

4. In a pulse radar system comprising means for transmitting pulses of high frequency radiant energy at a birecurrent repetition rate of mean value $1/T$, means for receiving echo pulses reflected from targets, a coherent oscillator operating at said high frequency and synchronized with said transmitted pulses, a phase and frequency stabilized intermediate frequency oscillator, and means for deriving from said echoes and said high frequency and intermediate frequency oscillators intermediate frequency coherent echo pulses, means for providing an improved control signal for a moving target indicator, said means comprising:

a phase comparator circuit having two inputs respectively coupled to said means for deriving said coherent echo pulses and to said intermediate frequency oscillator and an output supplying a signal which is proportional to the phase difference $\varphi_i$ of the signals applied to the inputs of said comparator circuit;

switching means, comprising a delay device, coupled to said output of said comparator circuit, said switching means having a control input coupled to said transmitting means, and an output supplying at a constant repetition rate said signals originating from the same target;

computing means comprising an input coupled to said switching means output, an adder having three inputs and a first, a second and a third channel respectively coupled between said last mentioned input and said three inputs, said first channel being a direct channel, said second channel comprising means for delaying by a delay T and for doubling and inverting signals supplied to this second channel, and said third channel comprising means for delaying signals supplied to this third channel by a delay 2T.

5. A radar system comprising
aerial means;
a Transmit-Receive switch, coupled to said aerial means, having a transmit input and a receive output;
a transmitter, for transmitting pulses of high frequency radiant energy, having a control input, a first output coupled to said transmit input, and a second output;
a clock, supplying synchronizing signals at intervals of time T, having an output;
a first delay device, of characteristic $\epsilon$ such that $\epsilon$ is negligible with respect to T, having an input coupled to said clock output, and an output;
a second delay device, of characteristic $\theta$ small with respect to T while $\epsilon$ is negligible with respect to $\theta$, having an input coupled to said first delay device output;
a first switch having a first signal input coupled to said second delay device input, a second signal input coupled to said second delay device output, a control input coupled to said clock output, and an output coupled to said transmitter control input;
a coherent oscillator, operating at said high frequency, having a control input coupled to said transmitter second output, and an output;
a phase and frequency stable intermediate frequency oscillator having output;

a first subtracting mixer having a first input coupled to said coherent oscillator output, a second input coupled to said intermediate frequency oscillator output, and an output;
a second subtractive mixer having a first and a second input respectively coupled to said receive output and to said first mixer output, and an output;
a third delay device, of characteristic $\theta$, having an input coupled to said second mixer output, and an output;
a second switch, having a first and a second signal input respectively coupled to said third delay device input and output, a control input coupled to said clock output so that said second switch is positioned on its first input when said first switch is positioned on its second input and conversely, and an output;
a third subtractive mixer having a first and a second input, and an output;
a first and a second channel having respective inputs coupled to said second switch output and respective outputs coupled to said first and second inputs of said third subtractive mixer, said first channel comprising a delay device of characteristic T and said second channel comprising frequency changing means including mixing means and phase and frequency stable oscillating means;
subtracting means having a first input directly coupled to said third mixer output, a second input and an output;
a fourth delay device of characteristic T coupled between said third mixer output and said subtracting means second input;
detecting means having a control input coupled to said subtracting means output, and an output;
and moving target echo selecting means having a control input coupled to said detecting means output.

6. A radar system comprising
aerial means;
a Transmit-Receive switch, coupled to said aerial means, having a transmit input and a receive output;
a transmitter, for transmitting pulses of high frequency radiant energy, having a control input, a first output coupled to said transmit input, and a second output;
a clock, supplying synchronising signals at intervals of time T, having an output;
a first delay device, of characteristic $\epsilon$ such that $\epsilon$ is negligible with respect to T, having an input coupled to said clock output, and an output;
a second delay device, of characteristic $\theta$ small with respect to T while $\epsilon$ is negligible with respect to $\theta$, having a first terminal coupled to said first delay device output, and a second terminal;
a coherent oscillator operating at said high frequency, having a control input coupled to said transmitter second output and an output;
a phase and frequency stable intermediate frequency oscillator having an output;
a first subtracting mixer having a first input coupled to said coherent oscillator output, a second input coupled to said intermediate frequency oscillator output, and an output;
a second subtractive mixer having a first and a second input respectively coupled to said receive output and to said first mixer output, and an output coupled to said second terminal;
a switch having a first and second signal input respectively coupled to said first and second terminals of said second delay device, a control input coupled to said clock output, and an output;
a first separator circuit having an input coupled to said switch output, and an output coupled to said transmitter control input;
a second separator circuit having an input coupled to said switch output, and an output;
a third subtractive mixer having a first and a second input, and an output;

a first and a second channel coupled to said second separator circuit output, and respectively to said first and second inputs of said third subtractive mixer, said first channel comprising a delay device of characteristic T and said second channel comprising frequency changing means including mixing means and phase and frequency stable oscillating means;

subtracting means having a first input directly coupled to said third mixer output, a second input and an output;

a fourth delay of characteristic T coupled between said third mixer output and said subtracting means second input;

detecting means having a control input coupled to said subtracting means output, and an output;

and moving target echo selecting means having a control input coupled to said detecting means output.

7. A radar system comprising:
aerial means;
a Transmit-Receive switch, coupled to said aerial means, having a transmit input and a receive output;
a transmitter, for transmitting pulses of high frequency radiant energy, having a control input, a first output coupled to said transmit input, and a second output;
a clock, supplying synchronizing signals at intervals of time T, having an output;
a first delay device, of characteristic $\epsilon$ such that $\epsilon$ is negligible with respect to T, having an input coupled to said clock output, and an output;
a second delay device, of characteristic $\theta$ small with respect to T while $\epsilon$ is negligible with respect to $\theta$, having an input coupled to said first delay device output;
a first switch having a first signal input coupled to said second delay device input, a second signal input coupled to said second delay device output, a control input coupled to said clock output and an output coupled to said transmitter control input;
a coherent oscillator, operating at said high frequency, having a control input coupled to said transmitter second output, and an output;
a phase and frequency stable intermediate frequency oscillator having an output;
a first subtracting mixer having a first input coupled to said coherent oscillator output, a second input coupled to said intermediate frequency oscillator output, and an output;
a second subtracting mixer having a first and a second input respectively coupled to said receive output and to said first mixer output, and an output;
a phase comparator circuit having a first input coupled to said second mixer output, a second input coupled to said intermediate frequency oscillator output and an output;
a third relay device of characteristic $\theta$, having an input coupled to said comparator circuit output, and an output;
a second switch, having a first and a second signal input respectively coupled to said third delay device input and output, a control input coupled to said clock output so that said second switch is positioned on its first input when said first switch is positioned on its second input and conversely, and an output;
a computing circuit having a common input coupled to said second switch output and comprising an adder having a first input coupled to said common input, a second and a third input and an output, a first delay device of characteristic T having an input coupled to said common input and an output, a fifth delay device of characteristic T having an input coupled to said output of said fourth delay device and an output coupled to said third input, a multiplier inverter having an input coupled to said output of said fourth delay device and an output coupled to said second input of said adder.

8. A radar system comprising:
aerial means;
a Transmit-Receive switch, coupled to said aerial means, having a transmit input and a receive output;
a transmitter, for transmitting pulses of high frequency radiant energy, having a control input, a first output coupled to said transmit input, and a second output;
a clock, supplying synchronizing signals at intervals of time T, having an output;
a first delay device, of characteristic $\epsilon$ such that $\epsilon$ is negligible with respect to T, having an input coupled to said clock output, and an output;
a second delay device, of characteristic $\theta$ small with respect to T while $\epsilon$ is negligible with respect to $\theta$, having a first terminal coupled to said first delay device output, and a second terminal;
a coherent oscillator operating at said high frequency, having a control input coupled to said transmitter second output and an output; a phase and frequency stable intermediate frequency oscillator having an output;
a first subtracting mixer having a first input coupled to said coherent oscillator output, a second input coupled to said intermediate frequency oscillator output, and an output;
a second subtractive mixer having a first and a second input respectively coupled to said receive output and to said first mixer output, and an output coupled to said second terminal;
a switch having a first and a second signal input respectively coupled to said first and second terminals of said second delay device,
a control input coupled to said clock output, and an output;
a first separator circuit having an input coupled to said switch output, and an output coupled to said transmitter control input;
a second separator circuit having an input coupled to said switch output, and an output;
phase elaborating means having a first input coupled to said second mixer output, a second input, coupled to said intermediate frequency oscillator output, and an output, coupled to said second terminal, said phase elaborating means comprising a comparator circuit comprising in series a first section including N phase-shifters, N being equal to $2^n$ where $n$ is an integer, of respective phase-shift charatceristics $\varphi_0$ such that $N\varphi_0 = 2\pi$, and N phase detectors having respective outputs numbered 1 to N, and a second section comprising logic circuits having N outputs, numbered 1 to N, of respective weights 2, $2^2$ . . . $2^n$, and logic means having N first inputs coupled to said N outputs of said phase detectors and N second inputs coupled to said N outputs of said logic circuits, and an output coupled to said phase elaborating means outputs and providing a signal which is a function of the weight of that logic circuit output which is being energized and of the magnitude of the signal simultaneously supplied at the output of the phase detecting means of same rank;
computing means, having an input coupled to said second separator circuit output, and comprising means for delaying signals applied to its input by T and 2T and effecting the sum of the nondelayed signal, of the signal delayed by 2T and of the signal delayed by T, after doubling and inverting this latter signal, said computing means having an output;
and moving target switching echo selecting means, said means having a control input coupled to said last mentioned output.

9. In a pulse radar system in which pulses of radiant energy, transmitted by said system with a birecurrent repetition period of mean value T and reflected from targets, are beat with a reference "coherent" signal synchronized with the transmitted pulse to provide a "coherent" echo signal, means for providing an improved control signal for a moving target indicator, said means comprising:

means for causing to beat in pairs said coherent echo signals originating from successive echoes from the same target, said beating means including means for frequency translating one of the signals of said pair and means for eliminating the "sum" frequency signals of said beat, said beating means having an output;

means, having an input coupled to said output, for providing the difference of two successive signals supplied to said input;

detecting means, coupled to said last mentioned output and having an output supplying said improved control signal;

and indicating means having a control input coupled to said output of said detecting means.

References Cited by the Examiner
UNITED STATES PATENTS 2,746,033   5/1956   Bachmann _____ 343—7.7

CHESTER L. JUSTUS, *Primary Examiner.*

R. D. BENNETT, *Assistant Examiner.*